(12) United States Patent
Ray

(10) Patent No.: US 9,195,875 B1
(45) Date of Patent: Nov. 24, 2015

(54) METHOD AND APPARATUS FOR DEFINING FIELDS IN STANDARDIZED TEST IMAGING

(75) Inventor: Damon E. Ray, New Hope, MN (US)

(73) Assignee: Data Recognition Corporation, Maple Grove, MN (US)

( * ) Notice: Subject to any disclaimer, the term of this patent is extended or adjusted under 35 U.S.C. 154(b) by 1152 days.

(21) Appl. No.: 12/256,282

(22) Filed: Oct. 22, 2008

Related U.S. Application Data

(60) Provisional application No. 60/981,739, filed on Oct. 22, 2007.

(51) Int. Cl.
*G06K 9/00* (2006.01)

(52) U.S. Cl.
CPC ........................................ *G06K 9/00* (2013.01)

(58) Field of Classification Search
USPC .......... 382/181, 138, 254, 283; 434/350, 353, 434/359; 347/19, 41, 43
See application file for complete search history.

(56) References Cited

U.S. PATENT DOCUMENTS

| | | | |
|---|---|---|---|
| 4,813,077 A | 3/1989 | Woods et al. | |
| 4,817,179 A | 3/1989 | Buck | |
| 4,827,330 A * | 5/1989 | Walsh et al. | 358/452 |
| 4,837,842 A | 6/1989 | Holt | |
| 4,967,354 A | 10/1990 | Buchanan | |
| 4,978,305 A | 12/1990 | Kraft | |
| 5,001,769 A | 3/1991 | Reid-Green et al. | |
| 5,004,896 A | 4/1991 | Serrell et al. | |
| 5,041,874 A | 8/1991 | Nishimori et al. | |
| 5,194,966 A | 3/1993 | Quardt et al. | |
| 5,313,291 A | 5/1994 | Appel et al. | |
| 5,321,611 A * | 6/1994 | Clark et al. | 434/353 |
| 5,363,318 A | 11/1994 | McCauley | |
| 5,433,615 A | 7/1995 | Clark | |
| 5,452,379 A * | 9/1995 | Poor | 382/317 |
| 5,521,722 A * | 5/1996 | Colvill et al. | 358/500 |
| 5,557,515 A | 9/1996 | Abbruzzese et al. | |
| 5,672,060 A * | 9/1997 | Poor | 434/322 |
| 5,735,694 A | 4/1998 | Clark et al. | |
| 5,825,947 A | 10/1998 | Sasaki et al. | |

(Continued)

FOREIGN PATENT DOCUMENTS

EP 0 374 892 B1 4/1997

OTHER PUBLICATIONS

"U.S. Appl. No. 12/256,303, Response filed Oct. 22, 2012 to Final Office Action mailed May 29, 2012", 10 pgs.
"U.S. Appl. No. 12/256,317, Notice of Allowance mailed Nov. 7, 2012", 9 pgs.
"U.S. Appl. No. 12/256,339 , Response filed Nov. 15, 2012 to Final Office Action mailed Sep. 7, 2012", 9 pgs.

(Continued)

*Primary Examiner* — Barry Drennan
*Assistant Examiner* — Aklilu Woldemariam
(74) *Attorney, Agent, or Firm* — Schwegman Lundberg & Woessner, P.A.

(57) ABSTRACT

Disclosed herein, among other things, are method and apparatus for defining fields in a standardized test imaging system. In various embodiments, at least one page of a standardized exam is converted into a raster image. One or more bubble response fields are automatically identified on the raster image and a location of one or more bubble response fields is stored in a database. According to various embodiments, a portion of the raster image is defined that includes one or more bubble response fields. A size of the bubbles of the one or more bubble response fields is selected, and one or more bubbles of the size selected are automatically detected. A position of each bubble detected is determined and stored, according to various embodiments.

16 Claims, 7 Drawing Sheets

(56) References Cited

U.S. PATENT DOCUMENTS

| | | | |
|---|---|---|---|
| 5,832,100 | A | 11/1998 | Lawton et al. |
| 5,907,742 | A | 5/1999 | Johnson et al. |
| 5,987,149 | A | 11/1999 | Poor |
| 5,987,302 | A | 11/1999 | Driscoll et al. |
| 6,141,120 | A | 10/2000 | Falk |
| 6,173,154 | B1 | 1/2001 | Kucinski et al. |
| 6,183,261 | B1 | 2/2001 | Clark et al. |
| 6,204,873 | B1 | 3/2001 | Shimazaki |
| 6,256,111 | B1 | 7/2001 | Rijavec |
| 6,321,052 | B1 | 11/2001 | Yamashina et al. |
| 6,366,759 | B1 | 4/2002 | Burstein et al. |
| 6,404,517 | B1 | 6/2002 | Chao |
| 6,459,509 | B1 | 10/2002 | Maciey et al. |
| 6,471,352 | B2 | 10/2002 | Akahira |
| 6,526,258 | B2 | 2/2003 | Bejar et al. |
| 6,532,026 | B2 | 3/2003 | Takahashi et al. |
| 6,645,029 | B2 | 11/2003 | Akahira |
| 6,714,321 | B2 | 3/2004 | Rao et al. |
| 6,832,825 | B1 | 12/2004 | Nishikori et al. |
| 6,947,571 | B1 | 9/2005 | Rhoads et al. |
| 7,027,187 | B1 | 4/2006 | Zuber |
| 7,084,998 | B2 * | 8/2006 | Blair et al. .................. 358/1.15 |
| 7,162,198 | B2 | 1/2007 | Kuntz et al. |
| 7,295,340 | B2 | 11/2007 | Mestha et al. |
| 7,406,392 | B2 | 7/2008 | Gedlinske et al. |
| 7,411,688 | B1 | 8/2008 | Zhai et al. |
| 7,474,783 | B2 | 1/2009 | Sharma et al. |
| 7,505,173 | B2 | 3/2009 | Viturro et al. |
| 7,516,895 | B2 | 4/2009 | Holoubek |
| 7,573,616 | B2 | 8/2009 | Poor |
| 7,630,931 | B1 | 12/2009 | Rachev et al. |
| 7,692,832 | B2 | 4/2010 | Klassen |
| 7,697,166 | B2 | 4/2010 | Bray |
| 7,742,991 | B2 | 6/2010 | Salzmann et al. |
| 7,831,195 | B2 | 11/2010 | Borchers |
| 7,835,043 | B2 | 11/2010 | Gila et al. |
| 7,992,953 | B2 | 8/2011 | Yorimoto et al. |
| 8,102,412 | B2 | 1/2012 | Klemer et al. |
| 8,488,220 | B1 | 7/2013 | Ray |
| 8,526,055 | B1 * | 9/2013 | Ray ................................ 358/1.9 |
| 8,649,601 | B1 | 2/2014 | Ray |
| 8,738,659 | B1 | 5/2014 | Ray |
| 2001/0028916 | A1 | 10/2001 | Akahira |
| 2001/0040979 | A1 | 11/2001 | Davidson et al. |
| 2002/0054384 | A1 | 5/2002 | Motamed |
| 2002/0126172 | A1 | 9/2002 | Akiyama |
| 2002/0161772 | A1 | 10/2002 | Bergelson et al. |
| 2003/0016263 | A1 | 1/2003 | Takahashi et al. |
| 2003/0118976 | A1 * | 6/2003 | Makishima et al. .......... 434/349 |
| 2003/0202029 | A1 | 10/2003 | Bronswijk et al. |
| 2004/0114164 | A1 | 6/2004 | Linder et al. |
| 2004/0117617 | A1 | 6/2004 | Geller et al. |
| 2004/0130739 | A1 | 7/2004 | Adam et al. |
| 2004/0131279 | A1 | 7/2004 | Poor |
| 2004/0264771 | A1 | 12/2004 | Sharma et al. |
| 2005/0024410 | A1 | 2/2005 | Subirada et al. |
| 2005/0094170 | A1 | 5/2005 | Ichitani |
| 2005/0206982 | A1 | 9/2005 | Hattori |
| 2005/0213790 | A1 | 9/2005 | Rhoads et al. |
| 2006/0028699 | A1 | 2/2006 | Venable et al. |
| 2006/0077407 | A1 | 4/2006 | Tanaka |
| 2006/0164700 | A1 | 7/2006 | Hayashi |
| 2006/0193017 | A1 | 8/2006 | Zuber |
| 2006/0227386 | A1 | 10/2006 | Nuuja et al. |
| 2006/0285134 | A1 | 12/2006 | Viturro et al. |
| 2006/0288279 | A1 * | 12/2006 | Yacoub et al. ................ 715/530 |
| 2007/0024657 | A1 | 2/2007 | Zhang et al. |
| 2007/0024928 | A1 | 2/2007 | Ono |
| 2007/0201112 | A1 | 8/2007 | Motamed |
| 2007/0247681 | A1 | 10/2007 | Klassen |
| 2008/0080027 | A1 | 4/2008 | Mestha et al. |
| 2008/0152371 | A1 | 6/2008 | Burry et al. |
| 2008/0225067 | A1 | 9/2008 | Morino et al. |
| 2008/0316552 | A1 | 12/2008 | Poor |
| 2009/0002724 | A1 | 1/2009 | Paul et al. |
| 2009/0059321 | A1 | 3/2009 | Buckley et al. |
| 2009/0086230 | A1 | 4/2009 | Reed |
| 2010/0231728 | A1 | 9/2010 | Holub |
| 2010/0284041 | A1 | 11/2010 | Warnes |
| 2014/0065595 | A1 | 3/2014 | Ray |

OTHER PUBLICATIONS

"U.S. Appl. No. 12/256,339, Examiner Interview Summary mailed Nov. 23, 2012", 3 pgs.

"U.S. Appl. No. 12/256,339, Final Office Action mailed Sep. 7, 2012", 15 pgs.

"U.S. Appl. No. 12/256,354, Notice of Allowance mailed Oct. 5, 2012", 7 pgs.

"U.S. Appl. No. 12/256,303, Non Final Office Action Mailed Jan. 5, 2012", 9 pgs.

"U.S. Appl. No. 12/256,303, Response filed Oct. 24, 2011 to Restriction Requirement mailed Jul. 23, 2011", 6 pgs.

"U.S. Appl. No. 12/256,303, Restriction Requirement mailed Aug. 23, 2011", 5 pgs.

"U.S. Appl. No. 12/256,317, Response filed Feb. 7, 2012 to Non Final Office Action mailed Oct. 7, 2011", 8 pgs.

"U.S. Appl. No. 12/256,317, Non Final Office Action mailed Oct. 7, 2011", 10 pgs.

"U.S. Appl. No. 12/256,317, Notice of Allowance mailed Mar. 2, 2012", 11 pgs.

"U.S. Appl. No. 12/256,339, Non Final Office Action mailed Jan. 10, 2012", 13pgs.

"U.S. Appl. No. 12/256,354, Non Final Office Action maied Mar. 1, 2012", 8 pgs.

"U.S. Appl. No. 12/256,354, Restriction Requirement mailed Nov. 21, 2011", 8 pgs.

"U.S. Appl. No. 12/256,317, Notice of Allowance mailed Mar. 19, 2013", 9 pgs.

"U.S. Appl. No. 12/256,339, Response filed Apr. 9, 2013 to Non Final Office Action mailed Jan. 9, 2013", 7 pgs.

"U.S. Appl. No. 12/256,339, Non Final Office Action mailed Jan. 9, 2013", 16 pgs.

"U.S. Appl. No. 12/256,354, Corrected Notice of Allowance mailed Jan. 17, 2013", 2 pgs.

"U.S. Appl. No. 12/256,354, Notice of Allowance mailed Feb. 1, 2013", 5 pgs.

"U.S. Appl. No. 12/256,354, Response filed Dec. 21, 2011 to Restriction Requirement mailed Nov. 21, 2011", 5 pgs.

""Score Image" Processing of Constructed-Responses, Essays, and Writing Samples", *UNISCORE, Incorporated*, (1992), 3 pgs.

"Image Processing of Open-Ended Questions", *UNISCORE, Incorporated*, (1992), 4 pgs.

Cason, Gerald J, et al., "Integrated Test Scoring, Performance Rating and Assessment Records Keeping", *Innovations in Medical Education, Association of American Medical Colleges*, Washington, D.C.., Paper presented at the annual meeting of the Association of Medical Colleges., (Nov. 1, 1987), 2-20.

Gathy, P, et al., "Computer-Assisted Self-Assessment (CASA) in Histology", *Computers Education.*, vol. 17, No. 2., (1991), 109-116.

Reid-Green, Keith S, "A High Speed Image Processing System [Journal Paper]", *IMC Journal*, vol. 26, No. 2, March-April, USA, (1990), 12-14.

Zuckerman, Ronald A, "Optical Scanning for Data Collection, Conversion & Reduction", *NTIS, U.S. Department of Commerce, National Technical Information Service*, August, Springfield, VA, USA, (1967), 49 pgs.

"U.S. Appl. No. 12/256,303, Notice of Allowance mailed Jan. 9, 2014", 12 pgs.

"U.S. Appl. No. 12/256,339, Response filed Nov. 15, 2013 to Final Office Action mailed Aug. 15, 2013", 9 pgs.

"U.S. Appl. No. 12/256,339, Final Office Action mailed Aug. 15, 2013", 16 pgs.

"U.S. Appl. No. 12/256,339, Notice of Allowance mailed Dec. 6, 2013", 15 pgs.

* cited by examiner

METHOD AND APPARATUS FOR DEFINING FIELDS IN STANDARDIZED TEST IMAGING

CROSS-REFERENCE TO RELATED APPLICATIONS

This application claims the benefit of provisional U.S. patent application Ser. No. 60/981,739, filed on Oct. 22, 2007, which is hereby incorporated by reference in its entirety.

TECHNICAL FIELD

This disclosure relates generally to method and apparatus for defining fields for scanned documents, and more particularly to method and apparatus for defining fields in standardized forms.

BACKGROUND

One method for evaluating the knowledge or skill of a person includes the use of standardized tests. For example, standardized tests are used to monitor the academic progress of students. Some standardized tests incorporate objective test questions that are answered by filling in an appropriate oval in an associated bubble-type answer sheet using a pencil. Some standardized tests include open-ended questions or tests. Examples of open-ended questions in these tests include essay questions, fill-in-the-blank questions, fill-in-the-map questions, math questions, and motor skill tests in which a test taker draws geometric shapes. Open-ended questions or tests, also referred to herein as scoring tasks or test items, are evaluated and scored by a human reviewer, also referred to herein as a reader.

Standardized tests are distributed from test processing centers to test-taking centers where the tests are administered to test-takers using standardized forms. One example of a test-taker is a student. Another example of a test-taker is a student who is taking home-based assessments.

In order to promote the integrity and accuracy of the administered tests and test results, it is desirable to properly define sections of the test when scanning the completed test, so that objective test items can be properly scored by machine and open-ended test items can be properly scored by readers.

Another practice by which information is obtained is a survey. Surveys are used to obtain information from a person, such as a consumer of goods or services. Surveys also use forms having standardized questions. Large amounts of data can be compiled from surveys using standardized forms. Thus, there is a need for accurate collection of data from the standardized forms.

Improved method and apparatus for defining fields in standardized forms and for imaging are needed.

SUMMARY

The above-mentioned problems and others not expressly discussed herein are addressed by the present subject matter and will be understood by reading and studying this specification.

Disclosed herein, among other things, are method and apparatus for identifying fields for scanned documents. According to an embodiment of a method, at least one page of a standardized exam is converted into a raster image. One or more bubble response fields are automatically identified on the raster image. A location of one or more bubble response fields is stored in a database. According to various embodiments, a portion of the raster image is defined that includes one or more bubble response fields. A size of the bubbles of the one or more bubble response fields is selected, and one or more bubbles of the size selected are automatically detected. A position of each bubble detected is determined and stored, according to various embodiments.

Another aspect of this disclosure relates to a method for image field definition. According to an embodiment, the method includes converting a scanned image from a first format to a second format and automatically searching the image for one or more bubble response fields on the image. The one or more bubble response fields are identified and a position of each bubble is stored in a database.

Another aspect of this disclosure relates to a system for image field definition. According to an embodiment, the system includes means for automatically converting at least one page of a standardized exam into a raster image. The system also includes means for identifying one or more bubble response fields on the raster image. According to an embodiment, the system further includes means for storing a location of one or more bubble response fields in a database.

This Summary is an overview of some of the teachings of the present application and not intended to be an exclusive or exhaustive treatment of the present subject matter. Further details about the present subject matter are found in the detailed description and appended claims. The scope of the present invention is defined by the appended claims and their legal equivalents.

DETAILED DESCRIPTION

Figure 1:
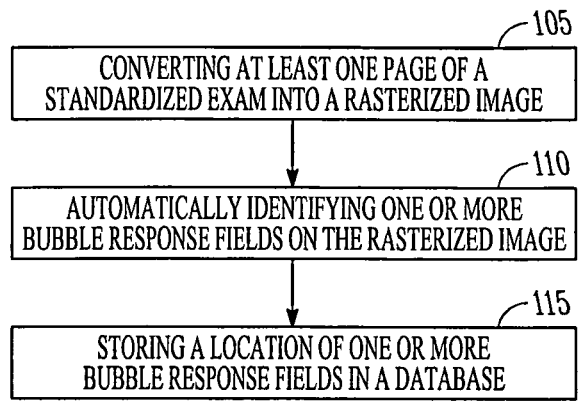
FIG. 1 illustrates a flow diagram of an embodiment of a method for identifying fields for scanned documents.

The following detailed description of the present subject matter refers to subject matter in the accompanying drawings which show, by way of illustration, specific aspects and embodiments in which the present subject matter may be practiced. These embodiments are described in sufficient detail to enable those skilled in the art to practice the present subject matter. References to "an", "one", or "various" embodiments in this disclosure are not necessarily to the same embodiment, and such references contemplate more than one embodiment. The following detailed description is demonstrative and not to be taken in a limiting sense. The scope of the present subject matter is defined by the appended claims, along with the full scope of legal equivalents to which such claims are entitled.

The image operation system purpose is to convert educational assessments and/or completed survey forms from a paper format to an electronic format. After response documents (responding to the educational assessment or survey) are scanned and proofs are generated in PDF format, the imaging system's image field definition application receives the PDF format, (1) converts to a format for use in the imaging system, (2) identifies bubble response fields, and (3) identifies constructive response fields.

The present subject matter generally relates to apparatus and method for defining fields for scanned documents, and more particularly to apparatus and method for defining fields in standardized test imaging. The image field definition (IFD) application is used to identify the location of bubbles (for objective test question responses) and constructed (or open-ended) response items in test booklets. This defines fields the scorers (both human and machine) will receive. This application is also used to set editing rules for each project, and convert vector images (such as PDF) into raster images (such as TIFF) format for used in an imaging system. Bubbles refer to any two-dimensionally closed form adapted to be filled in with a writing utensil, such as but not limited to: a circle, an ellipse, a square, and a rectangle. Bubbles with other shapes and sizes can be used without departing from the scope of this disclosure.

In order to successfully scan documents via the imaging operations system, a method of defining fields for scanner reading and target interpretation is provided. Both 'bubble' targets (multiple choice or demographic fields) and constructed response items must be defined. The imaging system locate page reference marks (T-Marks) within a defined search area, processes gray-scale images containing bubbled fields, applies mark levels and mark discrimination parameters, establishes editing rules, associates images with pages, scans and defines constructed response fields for importation into the hand scoring client, and establishes constructed response scoring rules. Documents scanned by the systems comply with standard layout specifications. A master image is generated in a useable format for each page of a scanned document and made accessible for defining bubbled and/or constructed response fields that reside on a page. The conversion from PDF to TIFF uses reference marks on the image, such as "T" marks to define relative locations on the image, in an embodiment. In the event that a PDF file is not provided for material, the actual documents can be scanned on a scanner and imported into this application using the scanned image file as the imported image.

FIG. 1 illustrates a flow diagram of an embodiment of a method for identifying fields for scanned documents. According to an embodiment of a method, at least one page of a standardized exam is converted into a raster image, at 105. At 110, one or more bubble response fields are automatically identified on the raster image. At 115, a location of one or more bubble response fields is stored in a database.

Bubble response fields are automatically identified using a search algorithm. A search is performed to identify a predefined shape (bubble). A first location is searched, and if unsuccessful, another location adjacent the first location (by a predefined number of pixels) is searched. As discussed below with respect to FIGS. 5A-5D, a user defines parameters used in the search. According to various embodiments, a portion of the raster image is defined that includes one or more bubble response fields. A size of the bubbles of the one or more bubble response fields is selected, and one or more bubbles of the size selected are automatically detected. A position of each bubble detected is determined and stored, according to various embodiments. In various embodiments, types of raster images include TIFF and JPEG image. Automatically converting at least one page of a standardized exam into a raster image includes converting the page from a PDF image into a raster image, in an embodiment. In one embodiment, converting into a raster image includes converting from a color image into a black and white image. The method further includes providing directions to locate one or more bubbles associated with a response for a particular question, in an embodiment. In various embodiments, the automatically identifying includes providing for a user input to define a number of bubbles within a bubble response field, automatically detecting one or more bubbles within the bubble response field, and verifying that the number of bubbles detected is equal to the number of bubbles defined. If the number detected is not equal to the number defined by the user, the user can either manually find the bubbles by tracing them in an embodiment, or can redraw the second box and allow the system another attempt to automatically find the bubbles as described. The process can then be repeated as necessary. The coordinates of the bubbles found are stored in a database. According to various embodiments, the coordinates of the bubbles are referenced from marks placed at predetermined locations on an image, such as "T" marks.

Defining a portion of the image includes allowing a user to draw a box around the field where the bubbles are to be identified, in various embodiments. An example is shown in FIG. 5D. In the depicted embodiment, the system allows the user to draw a first box 580 around a group location and a second box 585 around a field containing one or more bubbles. The system searches the second box 585 for bubbles having a shape defined by the user. According to various embodiments, the first box and the second box are shown in different colors on the screen. In FIG. 5C, a user defines the number of bubbles expected 570 within the defined second box. After the search, the system reports a number 590 of bubbles found compared to the number expected, providing verification to the user that the proper number were identified. The box should be as small as possible around the bubbles to shorten the time required for the search algorithm, in an embodiment.

Figure 2:
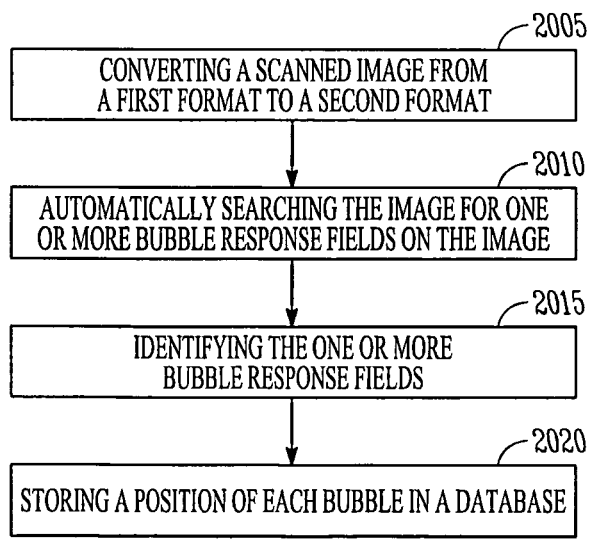
FIG. 2 illustrates a flow diagram of an embodiment of a method for image field definition in a standardized test imaging system.

FIG. 2 illustrates a flow diagram of an embodiment of a method for image field definition in a standardized test imaging system. According to an embodiment, the method includes converting a scanned image from a first format to a second format, at 2005, and automatically searching the image for one or more bubble response fields on the image, at 2010. At 2015, the one or more bubble response fields are identified and a position of each bubble is stored in a database, at 2020.

According to various embodiments, automatically searching the image includes using a pattern-matching search. In an embodiment, tolerances are defined for the pattern-matching search. Automatically searching the image includes searching the image for patterns of a shape and a size, in various embodiments. User input can be provided for defining the shape and the size. In one embodiment, converting a scanned image from a first format to a second format includes converting a scanned image from a portable document format (PDF). Converting a scanned image from a first format to a second format includes converting a scanned image from a tagged image file format (TIFF), in various embodiments. In various embodiments, the method further includes providing for a user input to define a number of bubbles within a bubble response field, automatically detecting one or more bubbles within the bubble response field, and verifying that the number of bubbles detected is equal to the number of bubbles defined.

According to various embodiments, scoring information is stored for use in scoring a response to each of the one or more bubble response fields. The method further includes storing instructions as to how the response to each of the one or more bubble response fields is scored. A number of bubbles associated with each bubble response field can also be stored.

Directions are provided to locate one or more bubbles associated with a response for a particular question. In one embodiment, a second section of an image is defined for constructed responses. The first section and the second section are reviewed to confirm proper definition, including converting both fields and storing images in a database.

Figure 3:
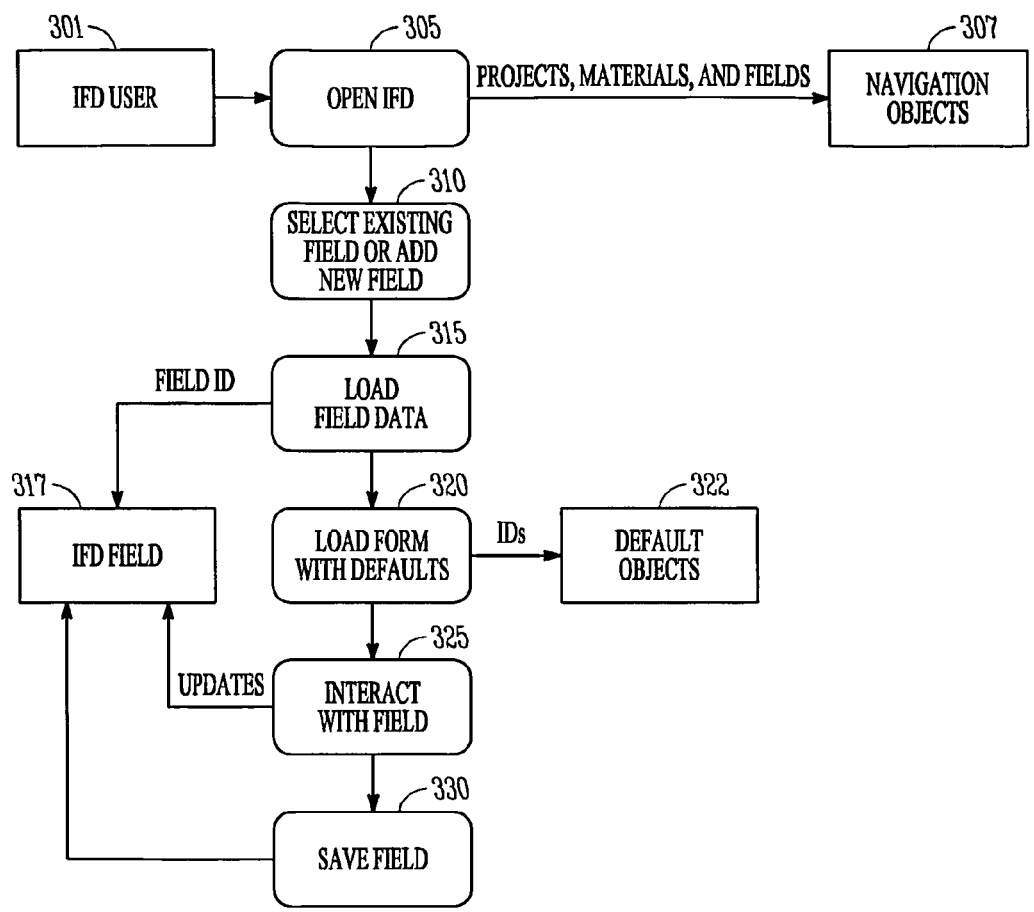
FIG. 3 illustrates a data flow diagram of a method for identifying fields for scanned documents, according to an embodiment.

FIG. 3 illustrates a data flow diagram of a method for identifying fields for scanned documents, according to an embodiment. At 305, a user 301 of the image filed definition (IFD) system opens IFD, incorporating projects, materials and fields from navigation objects 307. At 310, an existing filed is selected or a new field is added. Field data 317 is loaded at 315, and a form is loaded with default objects 322 at step 320. The field is updated via interaction at 325, and saved at 330.

Various embodiments include a method for defining constructed response locations. A constructed response is defined as a response that is not a bubble response. An example is a written or typed response to an essay or short-answer question on an examination. The system allows a user to define the area on the answer form that includes the constructed response. The defined area is then provided to a reader or grader for evaluating and scoring the content of the response. According to various embodiments, a user defines the field name and edit rules as with bubble responses in FIGS. 5A-5C. The user then draws a box around the question and answer (or just the answer, depending on the application), and the data regarding the location of the box is stored in a database. The data regarding the location is used in other applications, according to various embodiments.

To view the Constructed Response screen, the user must first select a valid page or item from the IFD common navigation screen. Then, the user chooses a task in various embodiments. The selected task dictates which Constructed Response screen is shown: Add Item—displays Define Items tab with default field values; Edit Item—displays Define Items tab with saved field values; View Item—displays Define Items tab with saved field values, read only; Delete Item—deletes item, does not show Constructed Response screen; Setup Validity Items—Displays Setup Validity Items tab. Once the user is able to view the Constructed Response Screen, closing the application directly or clicking another tab will prompt the user to save/cancel their changes (if data is valid and is changed). The user may choose the Save command from the menu/toolbar at any time to save changes to the database. Changes will only be saved if the data is valid.

Figure 4:
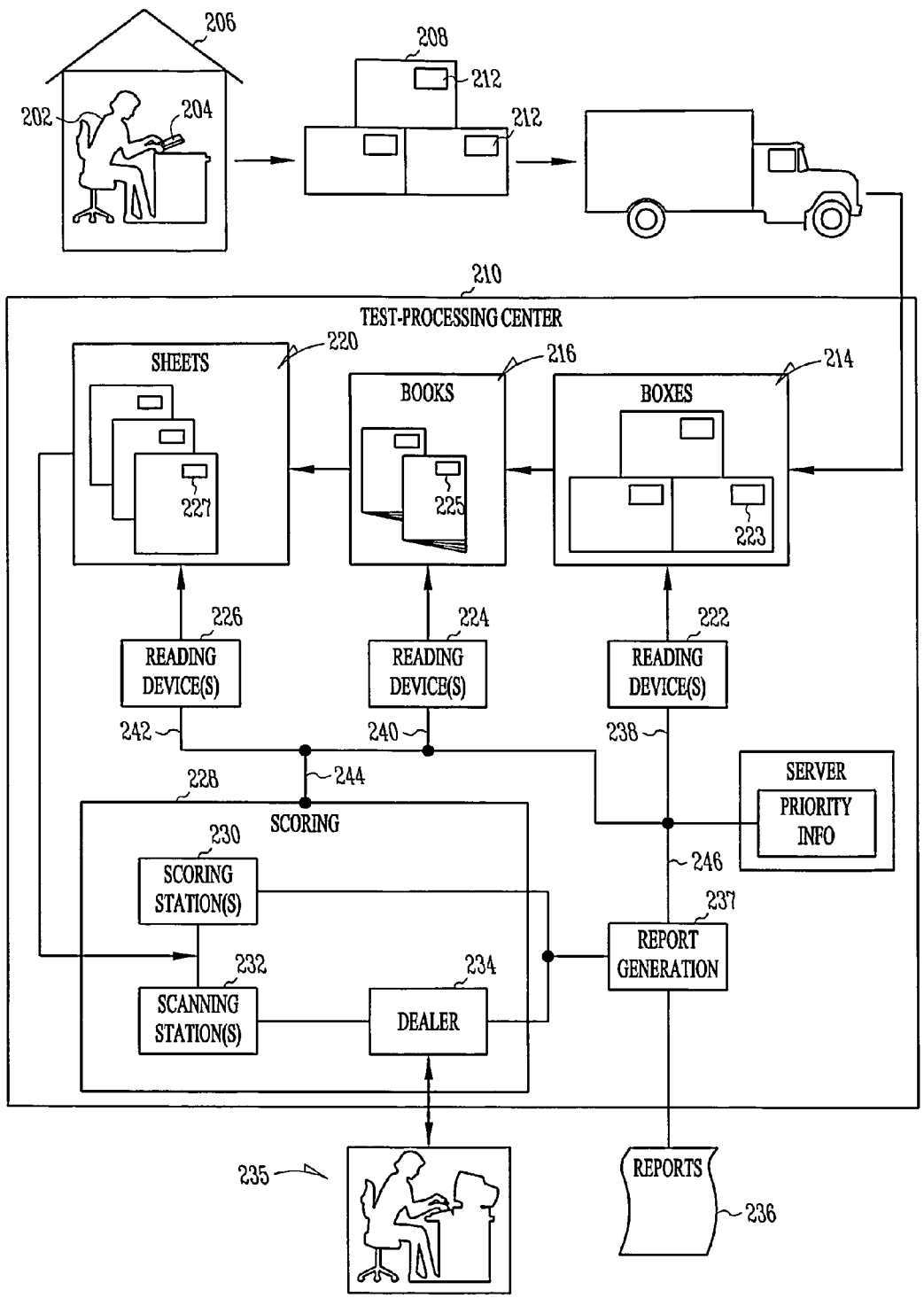
FIG. 4 illustrates a block diagram of an embodiment of an apparatus for processing and scanning documents.

FIG. 4 illustrates a block diagram of an embodiment of an apparatus for processing and scanning documents. The system resides outside the scanning system, and is a setup application used to tell the scanning system how to scan pages of a completed test. In the illustrated embodiment, a test-taker (e.g., a student) 202 completes a standardized test 204 at a test-taking center (e.g., a school) 206. In this embodiment, the standardized tests include test booklets. Each test booklet includes a number of pages that contain a number of test items or questions.

Completed test booklets are boxed, illustrated at 208, for shipping to a test-processing center 210. The boxes include an identifier 212, such as a bar code for example. Upon arriving at the test-processing center 210, the boxes of test booklets are unloaded at 214. The test booklets are removed from the boxes and sorted at 216. At 220, the test booklets are cut into loose pages. These loose pages are reconciled to ensure that all of the pages for each test booklet are accounted for. Reading devices 222, 224, and 226, such as bar code scanners for example, are used to read the identifiers 223 and identify the boxes, read the identifiers 225 and identify the test booklets, and read the identifiers and identify the pages. In one embodiment, the image field definition system identifies the identifying markings for the pages.

The test pages are graded or scored at 228. In one embodiment, objective scoring tasks, such as multiple choice questions for example, are scored using scoring of tests from images 230. In one embodiment, open-ended scoring tasks are scanned at scanning stations 232, are stored in a queue, and are distributed by a dealer 234 to human readers 235 who evaluate the open-ended scoring tasks. Reports 236 of the score results are provided at 237.

A server in the test-processing center is used to perform a variety of tasks with the scanned data, as discussed herein. In one embodiment, the server includes priority information, as illustrated via lines 238, 240, 242, 244 and 246, the priority information is available at various places along the process. In one embodiment, for example, the reading device(s) 222 determines which of the boxes should proceed for further processing before other boxes. In one embodiment, the reading device(s) 224 determine which of the test booklets should proceed for further processing before other test booklets. In one embodiment, the reading device(s) 226 determine which of the pages (or test items on the pages) should proceed for further processing before other pages (or test items on the pages). In one embodiment, for example, the priority information is used in the scoring system 228 to determine which test items should be scored before other test items. In one embodiment, for example, the priority information is used to determine which reports should be provided before other reports 236.

Figure 5A:
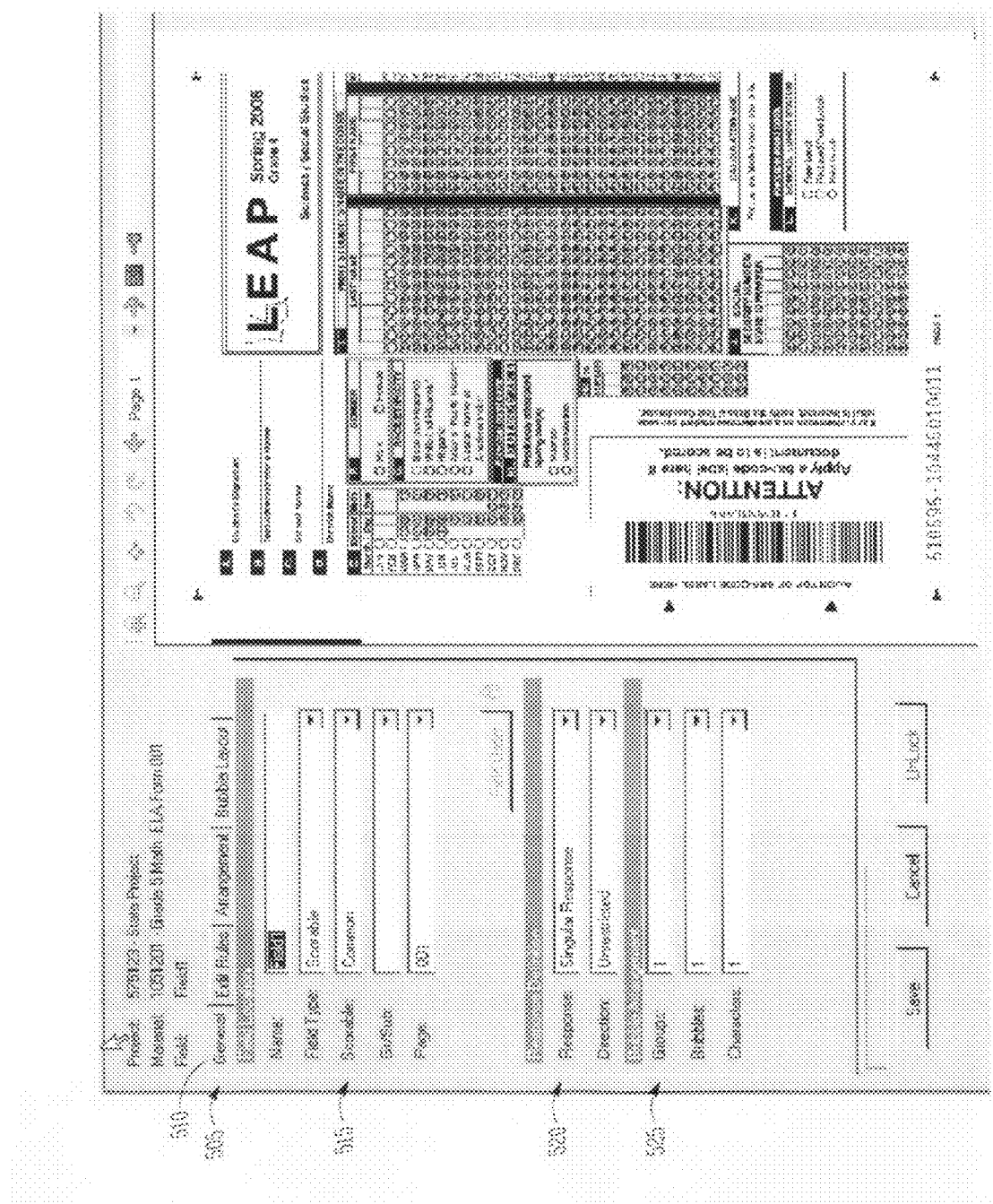
FIGS. 5A-5D illustrate screen displays in an imaging system, according to various embodiments.
Figure 5B:
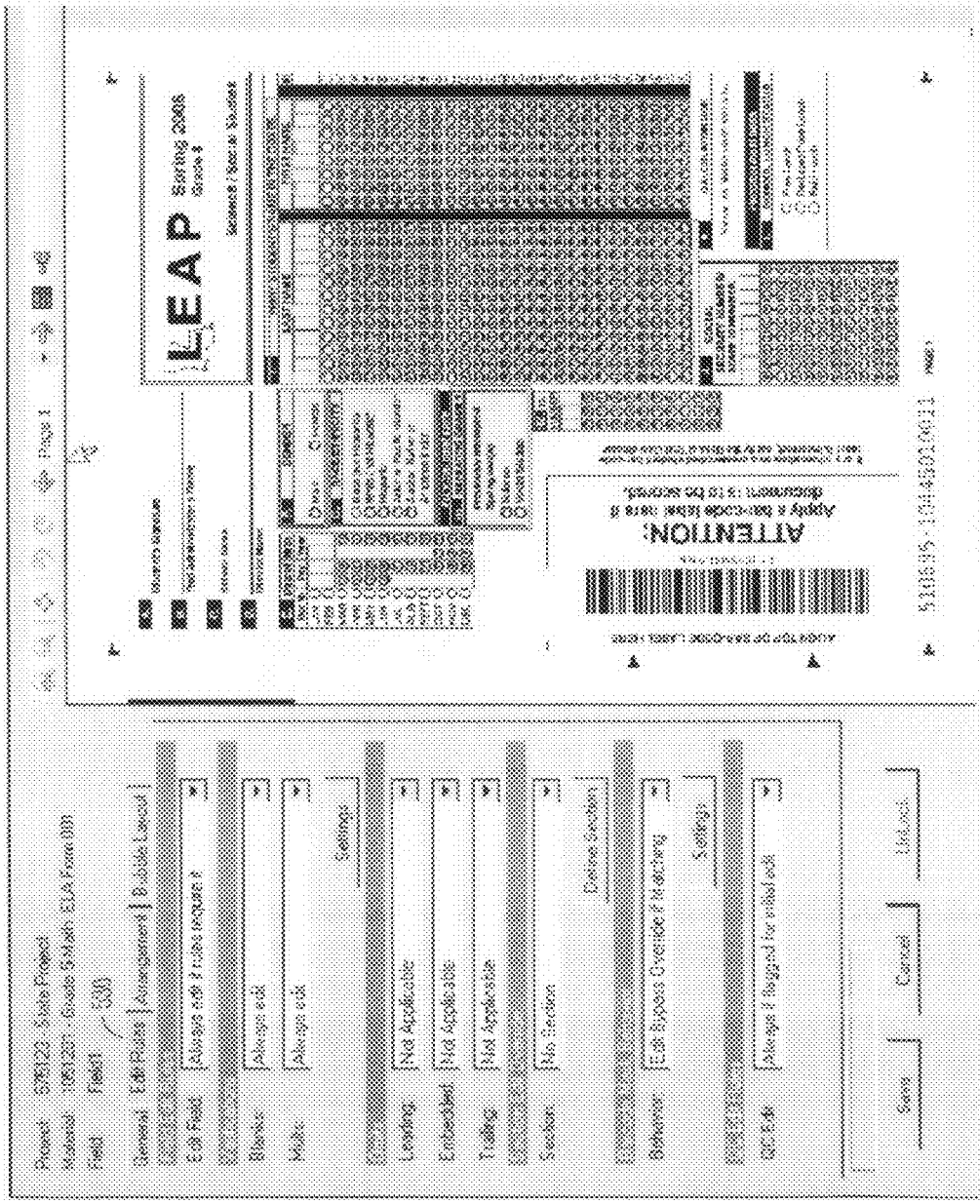
Figure 5C:
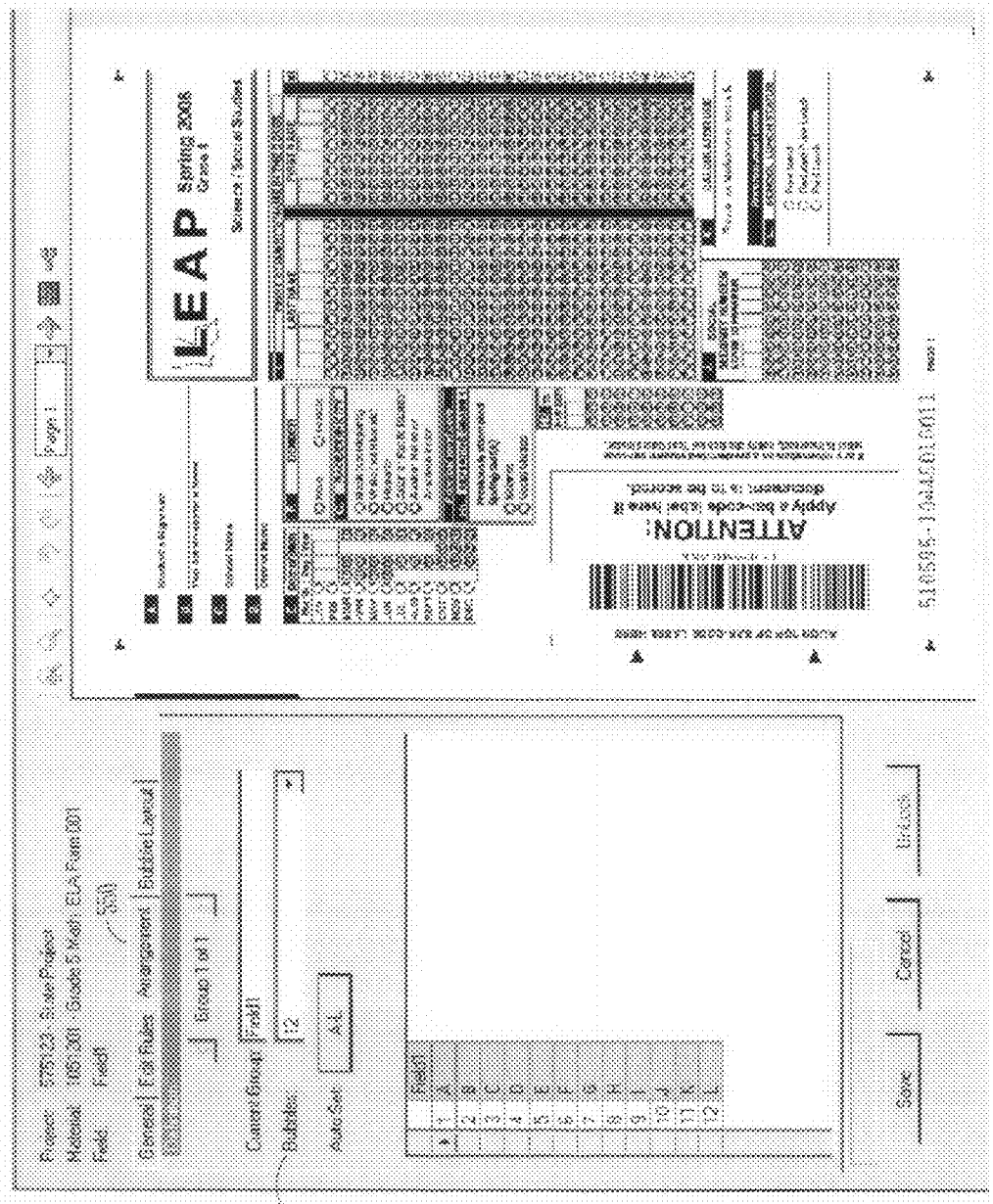
Figure 5D:
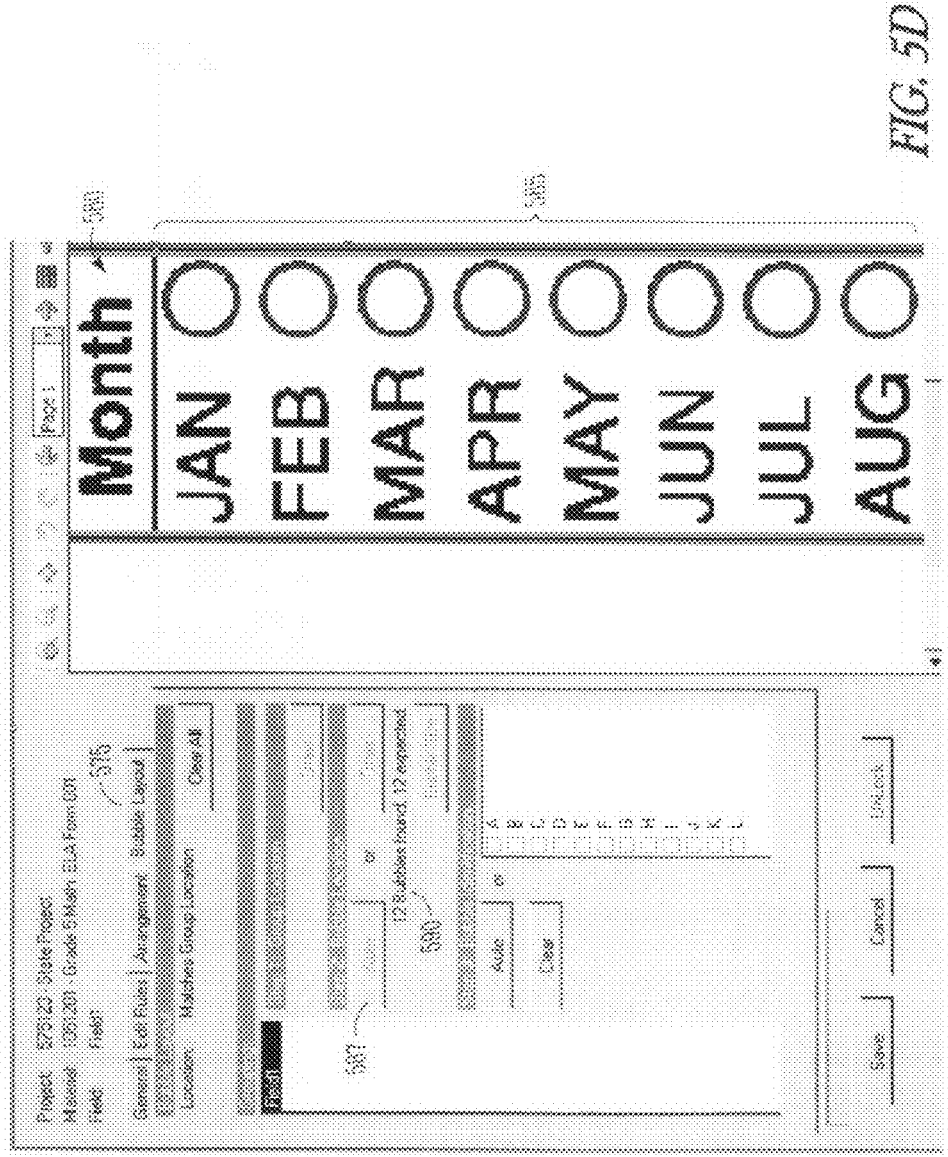

FIGS. 5A-5D illustrate screen displays in an imaging system, according to various embodiments. FIG. 5A illustrates a screen display showing image available to a user for defining fields. A number of tabs 505 are provided for the user to click on to provide and view information for defining parameters to the system. In FIG. 5A, the General tab 510 is shown. A number of data entry blanks are provided to the user, including ones for field location 515, response definition 520, and bubble arrangement 525. FIG. 5B illustrates a screen display showing the edit rules screen. This is displayed when a user clicks on the edit rules tab 530. The blanks provided allow a user to define rules for editing or reviewing information obtained by the system in identifying fields and bubbles. FIG. 5C illustrates a screen display showing the arrangement screen. This is displayed when a user clicks on the arrangement tab 550. In the depicted embodiment, a user defines the number of bubbles expected 570 within a defined field. FIG. 5D illustrates a screen display showing the bubble layout screen. This is displayed when a user clicks on the bubble layout tab 575. In FIG. 5D, the system allows the user to draw a first box 580 around a group location and a second box 585 around a field containing one or more bubbles. The system searches the second box 585 for bubbles having a shape defined by the user. As stated with respect to FIG. 5C, a user defines the number of bubbles expected 570 within the defined second box. After the search, the system reports a number 590 of bubbles found compared to the number expected, providing verification to the user that the proper number were identified. In an embodiment, the user does not draw a second box, but rather clicks the auto button 587 and the system searches the entire field for bubbles.

Specific embodiments have been illustrated and described herein, however, is to be understood that the above description is intended to be illustrative, and not restrictive. The scope of the present subject matter should be determined with reference to the appended claims, along with the full scope of legal equivalents to which such claims are entitled.

I claim:

1. A method, comprising:
    converting at least one page of a standardized exam into a raster image;
    automatically identifying a location of at least one bubble response field on the raster image, thereby providing an identified location of the at least one bubble response field, wherein user input defines a number of bubbles in the identified location, and wherein at least a portion of the at least one bubble response field is demarcated using a graphical user interface;
    storing the identified location in a database;
    automatically detecting one or more bubbles within the at least one bubble response field; and
    verifying whether the number of bubbles detected is equal to the number of bubbles defined by the user input.

2. The method of claim 1, wherein the automatically identifying further includes:
    selecting a size of the bubbles within the at least one bubble response field;
    automatically detecting one or more bubbles of the size selected; and
    determining and storing a position of each bubble detected.

3. The method of claim 1,
    wherein it is verified that the number of bubbles detected is equal to the number of bubbles defined by the user input.

4. The method of claim 1, wherein automatically converting at least one page of a standardized exam into a raster image includes converting the page into a tagged image file format (TIFF) image.

5. The method of claim 1, wherein automatically converting at least one page of a standardized exam into a raster image includes converting the page from a portable document format (PDF) image into a raster image.

6. The method of claim 1, wherein automatically converting at least one page of a standardized exam into a raster image includes converting from a color image into a black and white image.

7. The method of claim 1, further comprising:
    providing directions to locate one or more bubbles associated with a response for a particular question.

8. A method, comprising:
    converting a scanned image from a first format to a second format;
    automatically searching the image for at least one bubble response field on the image;
    identifying a position of the at least one bubble response field, thereby providing an identified position in the at least one bubble response field, wherein user input defines a number of bubbles within the bubble response field, and wherein at least a portion of the at least one bubble response field is demarcated using a graphical user interface;
    storing the position of each bubble in a database;
    automatically detecting one or more bubbles within the bubble response field; and verifying whether the number of bubbles detected is equal to the number of bubbles defined.

9. The method of claim 8,
    wherein it is verified that the number of bubbles detected is equal to the number of bubbles defined.

10. The method of claim 8, wherein automatically searching the image includes using a pattern-matching search.

11. The method of claim 10, wherein automatically searching the image includes defining tolerances for the pattern-matching search.

12. The method of claim 10, wherein automatically searching the image includes searching the image for patterns of a shape and a size.

13. The method of claim 12, wherein automatically searching the image includes providing user input for defining the shape and the size.

14. The method of claim 8, wherein converting a scanned image from a first format to a second format includes converting a scanned image from a portable document format (PDF).

15. The method of claim 3 wherein if the number detected is not equal to the number defined by the user, further comprising detecting the bubbles by tracing.

16. The method of claim 3, wherein if the number detected is not equal to the number defined by the user, further comprising redemarcating at least a portion of the at least one bubble response field.

* * * * *